United States Patent
Simoes

(10) Patent No.: US 10,070,672 B2
(45) Date of Patent: Sep. 11, 2018

(54) APPARATUS AND METHOD FOR CREATING PROTECTIVE EQUIPMENT

(71) Applicant: Sakproject International S.A., Viseu (PT)

(72) Inventor: Luis Flipe Carvalho Simoes, Viseu (PT)

(73) Assignee: Sakproject International S.A., Viseu (PT)

( * ) Notice: Subject to any disclaimer, the term of this patent is extended or adjusted under 35 U.S.C. 154(b) by 761 days.

(21) Appl. No.: 14/732,365

(22) Filed: Jun. 5, 2015

(65) Prior Publication Data

US 2015/0351467 A1 Dec. 10, 2015

(30) Foreign Application Priority Data

Jun. 6, 2014 (GB) .................................. 1410094.5

(51) Int. Cl.
*G06F 19/00* (2018.01)
*A41D 13/015* (2006.01)
*G05B 19/4097* (2006.01)
*A41D 13/05* (2006.01)
*A41D 13/06* (2006.01)
(Continued)

(52) U.S. Cl.
CPC ....... *A41D 13/015* (2013.01); *A41D 13/0543* (2013.01); *A41D 13/065* (2013.01); *A41D 13/08* (2013.01); *A41H 1/02* (2013.01); *G05B 19/4097* (2013.01); *G06F 17/50* (2013.01); *A41D 13/00* (2013.01); *G05B 2219/35044* (2013.01);
(Continued)

(58) Field of Classification Search
CPC .................................................... A41D 13/00

USPC ........................................................ 700/97
See application file for complete search history.

(56) References Cited

U.S. PATENT DOCUMENTS

| 8,908,928 B1* | 12/2014 | Hansen .............. G06K 9/00362 |
| | | 382/111 |
| 2007/0133850 A1* | 6/2007 | Paez ......................... A61F 5/01 |
| | | 382/128 |

(Continued)

FOREIGN PATENT DOCUMENTS

EP 1939776 A2 7/2008

OTHER PUBLICATIONS

Combined Search Report from counterpart GB Patent Application No. 1410094.5, dated Nov. 27, 2014, 5 pp.
(Continued)

*Primary Examiner* — David T Welch
(74) *Attorney, Agent, or Firm* — Shumaker & Sieffert, P.A.

(57) ABSTRACT

In the field of protective equipment, a method can be provided for design and manufacture of protective equipment that allows for a degree of customization to provide enhanced performance characteristics without incurring high cost. In some examples, the method includes a method of determining a mold for a body part including the steps of inputting body part information, searching a database of existing anatomical components and selecting components that most closely match the information, searching a database of body part models and selecting at least one body part model that closely corresponds to the selected components, creating a body part model from the selected components, comparing the two models and determining which model is most appropriate and using a mold associated with that model.

21 Claims, 6 Drawing Sheets

(51) Int. Cl.
*A41D 13/08* (2006.01)
*A41H 1/02* (2006.01)
*G06F 17/50* (2006.01)
*A41D 13/00* (2006.01)

(52) U.S. Cl.
CPC .............. *G05B 2219/49004* (2013.01); *G06F 2217/41* (2013.01); *Y02P 90/265* (2015.11)

(56) References Cited

U.S. PATENT DOCUMENTS

| | | | | |
|---|---|---|---|---|
| 2010/0023149 | A1* | 1/2010 | Sanders | A61F 2/5046 |
| | | | | 700/98 |
| 2013/0211531 | A1* | 8/2013 | Steines | A61F 2/4684 |
| | | | | 623/20.35 |
| 2015/0096426 | A1* | 4/2015 | Culver | G10D 3/163 |
| | | | | 84/322 |
| 2015/0248719 | A1* | 9/2015 | Hansen | G06Q 30/0627 |
| | | | | 705/26.63 |
| 2016/0045317 | A1* | 2/2016 | Lang | A61F 2/30942 |
| | | | | 700/98 |

OTHER PUBLICATIONS

Extended European Search Report from counterpart European Patent Application No. 15398007.3, dated Jun. 20, 2016, 14 pp.
Ma, et al., "Standard Component Library Design and Implementation for Plastic Injection Mold Design with a CAD Tool," Control and Automation, 2003, ICCA, Final Program and Book of Abstracts, the Fourth International Conference Jun. 10-12, 2003, pp. 981-985.
Unal, et al., "Customized Design of Hearing Aids Using Statistical Shape Learning," Medical Image Computing and Computer-Assisted Intervention, MICCAI 2008, Sep. 6, 2008, pp. 518-526.

* cited by examiner

APPARATUS AND METHOD FOR CREATING PROTECTIVE EQUIPMENT

This application claims the benefit of GB Application No. 1410094.5, filed Jun. 6, 2014. The entire contents of GB Application No. 1410094.5 is incorporated herein by reference.

TECHNICAL FIELD

The present disclosure relates to the field of protective equipment and in particular but not exclusively provides a method and apparatus for creating protective equipment.

BACKGROUND

Protective equipment is worn by many people in different fields, for example members of the armed forces or police force and those participating in sports such as football, hockey, rugby etc, in order to protect parts of the body from injury. Protective equipment is also sometimes worn by animals such as horses.

Most protective equipment is mass produced and thus consumers are given the choice of a few limited sizes and shapes. Since each person's anatomy is different this means that the protective equipment does not always fit the individual as well as it should in order to prevent injury. Indeed badly fitting equipment can result in discomfort to the individual in use and can result in injury.

Some efforts have been made to mitigate these problems but these relate to the production of highly specialized bespoke protective equipment that is specifically manufactured to fit the individual. Such highly customized equipment is very expensive, in part due to the requirement for highly trained technical staff to take appropriate measurements, and is thus not a viable option for many people, for example those participating in sports at an amateur level.

The following approach has been devised in view of drawbacks of known systems.

SUMMARY

Aspects of the invention are defined in the accompanying claims.

According to a first aspect there can be provided a method of determining a mold for a body part. The method including the steps of: obtaining information describing dimensions of a body part; using the information, searching a database of anatomical components and selecting components that in combination conform to the dimensions; searching a database of body part models and determining a database body part model that most closely corresponds to the selected components; creating a new model corresponding to the selected components; comparing the database body part model and the new model and determining a value representative of the difference between the two models; and creating a new mold based on the new model when the value is greater than a threshold and using a mold associated with the database body part model when the difference is less than the threshold.

This method determines whether a pre-existing mold is suitable for the particular information provided or whether it is more appropriate to create a new mold. This allows a degree of customization in the manufacture of protective equipment that results in better fitting equipment without the cost of manufacturing a fully bespoke product.

The step of searching the database of anatomical components and selecting components that in combination conform to the dimensions may include scaling one or more of the anatomical components before they are combined. By including a scaling step the different anatomical components in the database can be adjusted to more closely fit the information provided.

The body part may be a human leg and the selected anatomical components may include one or more selected from the group comprising: the calf area, Achilles tendon area, shin area and shin curve. Leg protection is particularly common in sports e.g. football, hockey, cricket and some martial arts etc.

The step of searching the database and determining a database body part model may include determining a plurality of database body part models. If more than one body part model is of a similar close fit to the information provided it may be appropriate to determine a plurality of body part models in order to ensure the best fit is selected.

The number of database body part models determined may be based upon a configuration input. Thus the user may select the number of database body part models to be selected depending on how closely it is required that the mold matches the input information.

The body part may be a human leg and the determined mold may be a mold for manufacture of a sock, shin guard or ankle brace.

The database of anatomical components may include the database of body part models. Thus one combined database may be provided instead of two separate databases.

Different scaling may be applied to each of the selected components based upon a configuration input. Thus the user can apply different scaling to the different components in order to arrive at a combination of anatomical components that most closely corresponds to the information provided.

In some examples the relative importance of each of the selected components may be determined based upon a configuration input. Thus the user can determine which anatomical components are of greater importance. This allows the user to identify where the focus of the protective equipment should be. For example if an end user of the protective equipment has a previous injury it may be more appropriate for the protective equipment to most closely match the user's body profile in one area than another in order to avoid recurrence of the injury. By allowing the relative importance of each of the selected components to be determined based upon a configuration input these variations can be taken into account.

The information relating to the body part may be obtained from measuring the body part. In another example the information may be obtained from photographs or video of the body part. Alternatively the information relating to the body part may be obtained from a 3D scan of the body part. Thus the most appropriate approach for obtaining the information relating to the body part of the individual in a given set of circumstances can be used.

The method may also include the step of inserting the new model into the database. Thus the database can be continually expanded in order to develop the database of information. This allows for a greater number of models to be compared to the information provided and thus can improve the accuracy of the mold selection for future reference.

The mold determined may be used for manufacturing protective equipment. Thus the final product can be manufactured using a mold that bears a close correspondence to the individual's body part.

According to a second aspect there can be provided a computer implemented method of creating a design for a piece of protective equipment, the design comprising a plurality of dimensional and/or material characteristics, the design conforming to a design constraint defining a performance requirement for a piece of protective equipment manufactured according to the design. The method including the steps of: receiving input to define a value for a first characteristic of the plurality of characteristics; determining a limited range of values for at least one of the remaining characteristics based on the value of the first characteristic and the design constraint, such that subsequent selection of values within the limited range of values will result in the design conforming to the design constraint; and constraining possible values for the at least one of the remaining characteristics to be within the limited range of values.

Thus this method assists in developing a design that complies with particular constraints for example a particular standard. Thus a design can be achieved that will comply with the constraint without any need for further verification.

The method may further include the steps of: receiving input to define a value for a second characteristic; determining a limited range of values for at least one of the remaining characteristics based on the values of the first and second characteristics and the design constraint such that subsequent selection of values within the limited range of values will result in the design conforming to the design constraint; and constraining possible values for the at least one of the remaining characteristics to be within the limited range of the values. Thus the method allows for a number of different characteristics to be constrained thus the method allows for compliance with a complex standard dependent upon a number of factors.

Altering the value of one characteristic may alter the range of values of the remaining characteristics. Thus the method allows for an alteration in the value of one characteristic to automatically change the range of values available for the remaining characteristics. Thus a flexible method that allows for easy alteration of the design is provided.

The characteristics may include one or more selected from the group comprising: material thickness, material finish, material impact resistance, material weight, material volume, material energy absorption capability, height of protection area and width of protection area. Thus a number of different characteristics of an item of protective equipment can be considered.

The method may further include the step of creating a visual representation or performance description of the design according to the defined values of the characteristics. The final design can thus be outputted in order for it to be checked if necessary and subsequently input to a further manufacturing step.

The method may further include the step of manufacturing the protective equipment according to the design. Thus manufacture of a product that complies with the particular restraint can be achieved.

According to a third aspect there can be provided a computer implemented method of creating a design for a piece of protective equipment, the design comprising a plurality of dimensional and/or material characteristics, the design conforming to a design constraint defining a performance requirement for a piece of protective equipment manufactured according to the design. The method including the steps of: receiving input to define a value for a first characteristic of the plurality of characteristics; determining a limited range of values for at least one of the remaining characteristics based on the value of the first characteristic and the design constraint, such that subsequent selection of values within the limited range of values will result in the design conforming to the design constraint; receiving input to define a value for a second characteristic of the plurality of design characteristics; and creating a compliance description which describes whether or not the design complies with the design constraint. Thus according to this aspect information is provided as to whether or not the design complies with the design constraint. It can thus be quickly determined whether the design is appropriate for the particular application.

According to a fourth aspect there can be provided a method of manufacturing body protective equipment. The method including the steps of: designing the protective equipment according to the method previously described; determining a mold of the body part according to the method previously described; and manufacturing the protective equipment according to the characteristics and the mold. Design and manufacture of a product that complies with a particular constraint is thus facilitated.

The method may further include the step of creating a graphical representation of the protective equipment and/or a performance description according to the characteristics of the mold before the protective equipment is manufactured. Thus it can be determined whether or not the design complies with a relevant constraint before it is manufactured.

The protective equipment may be manufactured by 3D printing. 3D printing allows for straight forward manufacture of customized products.

The method may further include the step of printing decorative material onto the protective equipment. The decorative material may include text, images, signatures, textures or any other graphical elements. The decorative material may be based on a configuration input. Thus the product can be further customized in terms of its visual appearance in accordance with the particular requirements of the end user.

The protective equipment may be a shin guard, a knee pad, an elbow pad, or a protective vest. Thus a method has been provided which can facilitate the manufacture of a variety of different pieces of protective equipment.

According to a further aspect there can be provided a computer program product configured to instruct a computer to perform the method previously described.

According to a further aspect there can be provided an apparatus for creating a design for a piece of protective equipment, the design comprising a plurality of dimensional and/or material characteristics, the design conforming to a design constraint defining a performance requirement for a piece of protective equipment manufactured according to the design, the apparatus including: a user interface operable to receive an input defining a value for a first characteristic of the plurality of characteristics; a processor operable to determine a limited range of values for at least one of the remaining characteristics based on the value of the first characteristic and the design constraint, such that subsequent selection of value within the limited range of values will result in the design conforming to the design constraint and operable to constrain using the user interface possible values for the at least one of the remaining characteristics to be within the limited range of values. An apparatus for developing a design that complies with particular constraints for example a particular standard is envisaged. Thus a design can be achieved that will comply with the constraint without any need for further verification The user interface may be operable to receive input defining a value for a second characteristic; and the processor may be operable to determine a limited range of values for at least one of the remaining characteristics based on the values of the first and second characteristics and the design constraint such that subsequent selection of values within the limited range of values will result in the design conforming to the design constraint and operable to constrain using the user interface possible values for the at least one of the remaining characteristics to be within the limited range of values. By enabling the user interface to receive multiple inputs, a more accurate design can be achieved.

The user interface may be operable to receive input altering the value of one of the plurality of characteristics and wherein the processor is operable to automatically alter the range of values for the remaining characteristics based on the input received. By enabling the user interface to receive input altering the value of one of the plurality of characteristics, a flexible design tool may be provided.

The apparatus may further include a design outputting section operable to display a visual representation of the design according to the defined values of the characteristics. Thus the design can be displayed to enable it to be approved before it is finalized.

The apparatus may include an outputter operable to output the protective equipment according to the design. The outputter may be a 3D printer.

According to another aspect there can be provided an apparatus for determining a mold for a body part, the apparatus including an interface operable to receive inputting information describing the dimensions of a body part; a processor operable to use the information to search a database of anatomical components and select components that in combination conform to the dimensions; and operable to search a database of body part models and determine a database body part model that most closely corresponds to the selected components; a generator operable to create a new model corresponding to the selected components; a comparator operable to compare the database body part model and the new model and to determine a value representative of the difference between the two models; and a generator operable to create a new mold when the value is greater than a threshold; and wherein when the difference is less than a threshold a mold associated with the database body part model is used. This apparatus is thus able to determine whether a pre-existing mold is suitable for the particular information provided or whether it is more appropriate to create a new mold. This allows a degree of customization in the manufacture of protective equipment that results in better fitting equipment without the cost of manufacturing a fully bespoke product According to a further aspect there can be provided an apparatus for manufacturing body protective equipment the apparatus including: the apparatus for creating a design for a piece of protective equipment as previously described; the apparatus for determining a mold for a body part as previously described; and an outputter operable to output the protective equipment according the characteristics of the design and the mold. The outputter may be a 3D printer. Thus an apparatus capable of carrying out the entire design and manufacture process is provided.

Further feature combinations provided by the present teachings will be understood from the following detailed description and accompanying figures.

BRIEF DESCRIPTION OF DRAWINGS

The present teachings will now be described by way of example only with reference to the following drawings in which like numerals reflect like elements.

Figure 1:
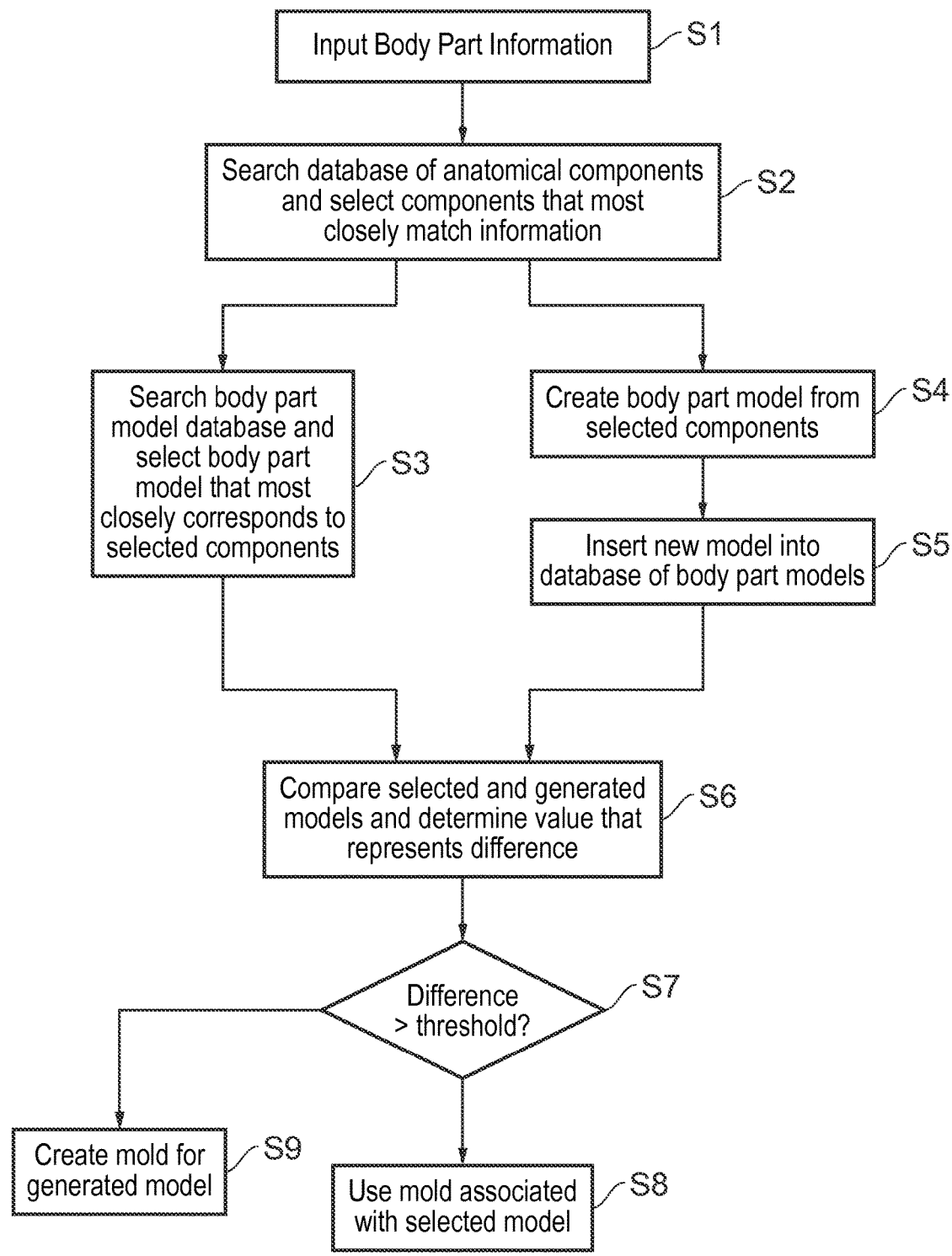
FIG. 1 is a flow chart of a method of determining a mold for the protective equipment.

While the invention is susceptible to various modifications and alternative forms, specific embodiments are shown by way of example in the drawings and are herein described in detail. It should be understood, however, that the drawings and detailed description attached hereto are not intended to limit the invention to the particular forms disclosed but rather the invention is to cover all modifications, equivalents and alternatives falling within the spirit and scope of the appended claims.

DETAILED DESCRIPTION

In order to create a piece of protective equipment that is customized to the individual, a mold is often used to ensure the required size and shape of the final product is achieved.

In the present disclosure a mold is a 3D representation of the particular body part which is to be protected by the protective equipment. The mold may be virtual or physical. Thus a piece of protective equipment can be designed and manufactured to fit the individual.

FIG. 1 illustrates a method of determining a mold for use in manufacturing a piece of protective equipment. This method makes use of existing data relating to other individuals in order to reduce cost whilst still taking into account the requirements of the individual. The method will be described using a shin guard as the example piece of protective equipment, however it will be appreciated that the method could be used to assist in the manufacture of other pieces of protective equipment for use on other parts of the body, such as elbow pads, knee pads, protective vests, face masks and helmets.

In step S1 information relating to the individual's body part is acquired and input to the method. The information includes dimensions of the individual's body part and any other information relevant for the determination of a mold, for example information identifying distinctive features of the body part. The information may be in the form of a written description or images. This information can be acquired by measuring the relevant body part. Alternatively the information can be inferred from photographs or videos of the individual body part. In another alternative the information can be acquired from a 3D scan of the individual body part. Other alternative means of acquiring the information relating to the individual body part that the skilled person may be aware of can also be used.

Once the body part information has been acquired, in step S2 the information is used to search a database of anatomical components in order to select those components that most closely match the information provided. The database is acquired by measuring a large number of body parts. For example in the example of a shin guard a large number of human legs were measured and the information saved in the database. Once the dimensions of the body parts are acquired the dimensions of individual components are acquired by dividing the body parts into the individual components. This may be done by computer software that identifies the individual components that in combination result in the body parts saved in the database.

Each anatomical component record in the database includes information specifying the dimensions and shape of the component to which the record relates. The anatomical components may be individual body components, for example a particular muscle, bone, tendon or ligament, or can be any combination of these relating to a single specific area e.g. an ankle area. When considering a mold for a shin guard, components such as the Achilles tendon area, shin area, calf area and shin curve may be selected. The selection of the anatomical components can be automatically carried out by the algorithm or the software can receive input as to which anatomical components are required. Where, for example, the database contains a plurality of the components required, those components that represent the best match to the information provided are selected.

The "best match" is acquired through a comparison of the anatomical components and the body part information. The anatomical components are selected so that they have approximately the same dimensional properties as the input information. For example the 3D shape of the anatomical components resembles the information input to the method. Visual clues relating to the shape of the body part also help to determine which anatomical components to select. For example shadows and colour gradients in any photographs may correspond to the 3D render of the anatomical components.

When selection of anatomical components is carried out, a given candidate set of components from the database may be virtually assembled to provide a composite set against which to test the acquired body part information.

In an alternative, the system may define pre-existing boundaries for each anatomical component to anatomical component interface such that individual anatomical components or subsets of anatomical components from the database may be compared to the acquired body part information without creating a complete candidate set of anatomical components to test against the acquired information.

Once the relevant anatomical components have been selected, the method proceeds in parallel to steps S3 and S4. In step S3 a body part model database is searched and a body part model that most closely matches the selected components is selected. The body part model database contains a smaller number of body part models compared to the number of anatomical components. This limited number of body part models are selected be representative of all the anatomical components in the anatomical component database. The limited number of body parts is obtained by dividing a large database of anatomical components and body parts into groups of similarly shaped body parts. For each group, the body part that is the dimensional median is selected to represent the group and becomes one of the limited number of body part models from which the closest match is selected. The number of groups may be selected automatically or may be set by the user. The body part model is not necessarily an exact match to the selected components and the information provided, but provides the best match available in the database.

In some examples a plurality of body part models may be selected that best represent the anatomical components selected. For example if two body part models are an equally close match to the anatomical components. The number of models to be selected can be set by the user depending upon their particular requirements. The fewer the number of body part models selected the simpler the production process and the lower the mold creation costs. However with a minimized number of models comes an increased risk that the fit of the manufactured product may be compromised.

In step S4 a new body part model is created corresponding to the particular anatomical components selected. This generated body part model differs from the body part model selected in step S3 in that it is an exact match to the anatomical components selected. In contrast the body part model selected in step S3 is the best match available from the limited number of body part models in the body part database that represent all of the anatomical components available.

In creating the new body part model, different scaling can be applied to the different components. For example the different anatomical components can have different sizes. The different scaling can be automatically programmed for the piece of protective equipment or can alternatively be individually selected by the user.

Additionally different levels of importance may be given to different components. For example the shin area may be given greater importance than the calf area. The relevant weighting can be automatically programmed for the particular piece of protective equipment or alternatively such relative weighting can be individually selected by the user.

Once a body part model matching the anatomical components selected has been created it can be optionally saved into the database of body part models in step S5. The generated body part model does not have to be saved into the body part model database but by doing so the database is enlarged and updated with new information which will be of use in the determination of subsequent models. In some implementations, the body part database is analysed periodically to check the body part models therein provide a good representation of all of the anatomical components in the anatomical component database. If new models have been obtained then previous models may be replaced to ensure a fair representation of all of the anatomical components. In the present example the body part database and the anatomical component database are separate but they may alternatively be different record types of a single database.

Once the two body part models have been acquired, one selected from the body part database in step S3 and one generated in step S4, the difference between the two models is determined and compared to a threshold value. If the difference between the two models is greater than the threshold value, a new mold corresponding to the newly generated body part model is created. If the difference between the two models is less than the threshold value then it is considered that the existing body part model is an acceptable match for the generated body part model and a mold associated with the existing body part model is used.

The threshold value may be dependent upon the particular application, for example there may be one threshold for a piece of leg protection and another threshold value for a piece of arm protection. The threshold can be determined based on empirical data and/or feedback from users. In one example the threshold is based on the difference in volume between the generated body part model and the selected body part model. A maximum acceptable difference in volume may be 5%. In another example a difference of 5% may be considered unacceptable and the maximum acceptable difference may be 3%. Ongoing feedback from users can be used to assist in the determination of the threshold for the particular application.

In some examples, each mold may be associated with a number of different body part models or considered in an alternative way, a number of different body part models may be associated with a single mold. In other interpretations, each model may have a corresponding mold.

The threshold value may be automatically selected for the particular body part or may be selected by the user depending on how accurate a mold is required.

Once a mold for the particular information has been determined the final product can be manufactured using the mold.

Figure 2:
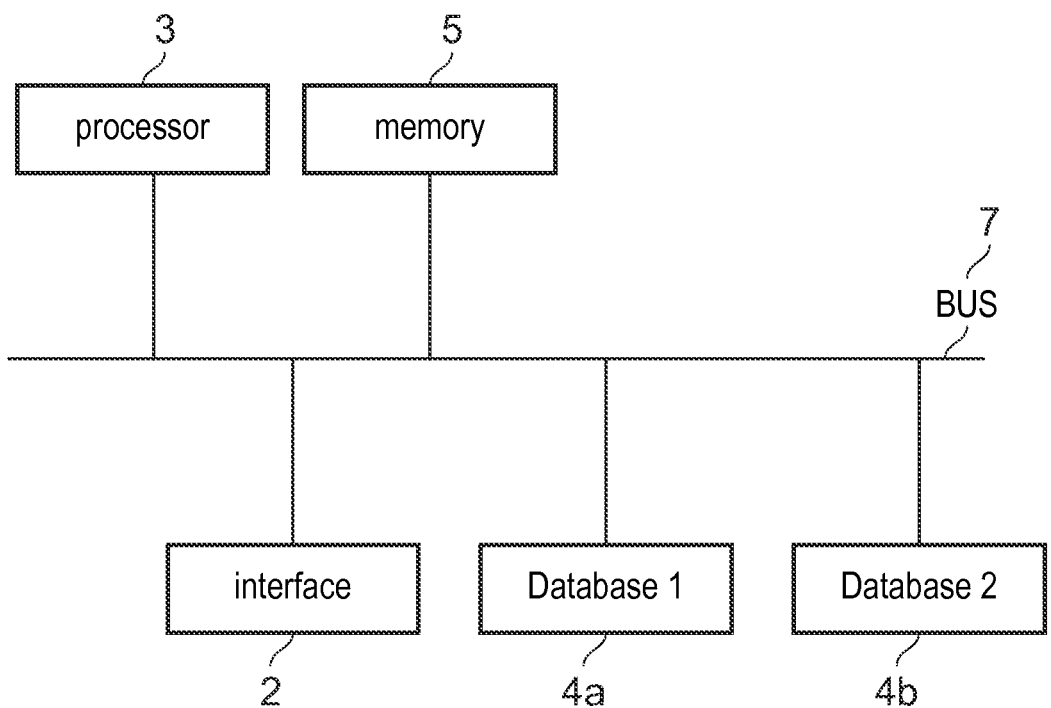
FIG. 2 illustrates an apparatus for carrying out the method of FIG. 1.

FIG. 2 illustrates an apparatus for carrying out a method of determining a mold for a body part. A computer is used to carry out the method described. The computer includes an interface 2, a processor 3, a first database 4a, a second database 4b, and a memory 5. These components all interact with one another via a bus 7.

The interface 2 receives information describing the dimensions of a body part. This may be in the form of a description or an image (including a 3D mesh work or other 3D image representation). The interface 2 may be a user interface or alternatively may be an interface with another computer in order to receive the information from that computer.

The processor 3 receives the information from the interface 2 and processes the information. Processor 3 uses the information to search a database of anatomical components 4a and select the components that conform to the dimensions provided. Processor 3 then searches a database of body part models 4b and determines a body part model that most closely corresponds to the anatomical components selected. Processor 3 also operates as a first generator, a comparator and a second generator. The operation as a first generator creates a new model based on the anatomical components selected. The operation as a comparator conducts a comparison of the new model generated by the first generator and the body part model determined from the database of body part models and determines a value representative of the difference between the two models. Finally the operation as a second generator creates a new mold when it is determined that the difference between the two models is greater than a threshold value.

A further optional feature of the apparatus is an outputting section for manufacturing the design. This may be any device suitable for manufacturing the design for example a 3D printer or an injection molding machine.

Therefore, a method and apparatus for determining a mold for use in manufacturing a piece of protective equipment has been described. Such method and apparatus can determine from measurements and/or images reflecting a body part, a set of representative anatomical components and can then determine from that set a model that suitably corresponds to the body part. From the model, a mold for use in manufacturing a piece of protective equipment for that body part can be determined. In the present examples before an item can be manufactured to a mold, the design of the protective equipment is also arrived at.

Figure 3:
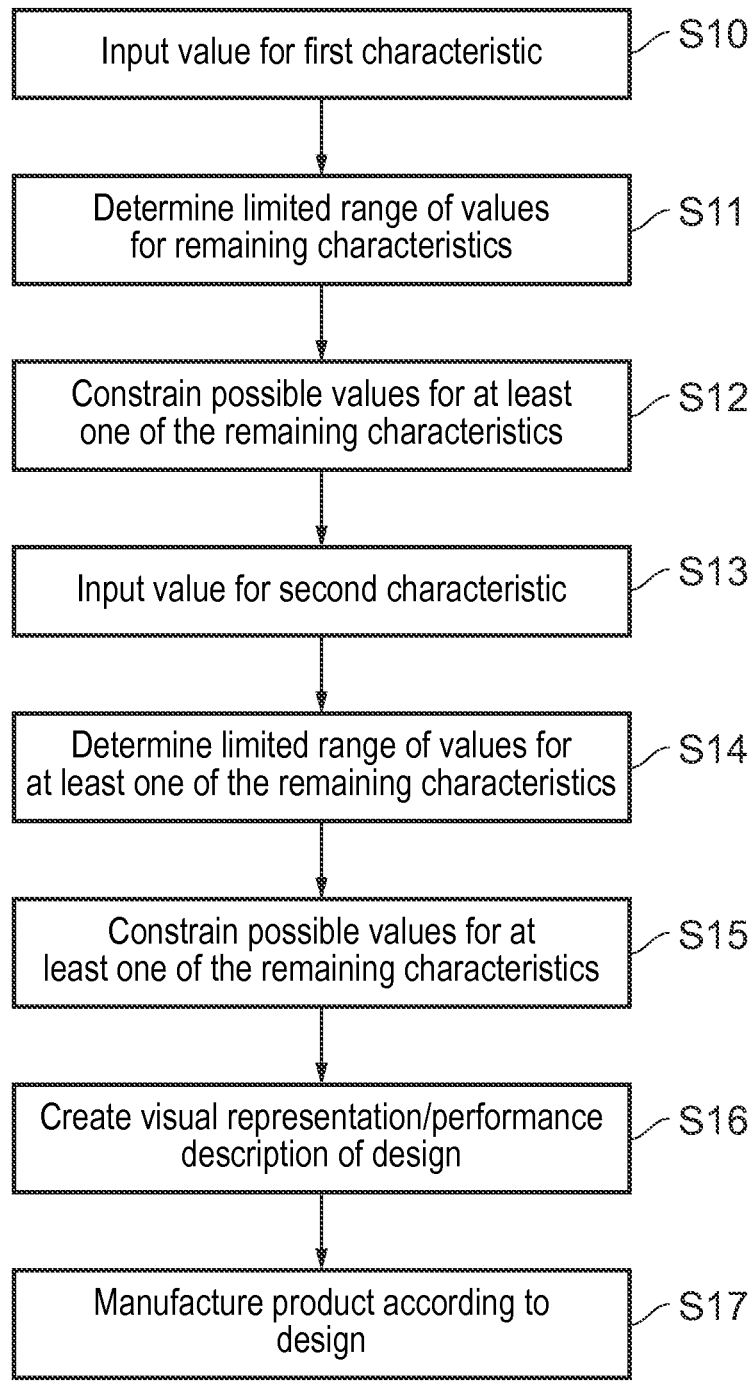
FIG. 3 is a flow chart of a method of determining the characteristics of a piece of protective equipment such that the equipment complies with a design constraint.

Protective equipment may be regulated and must comply with, for example, particular health and safety regulations. Designing a product to comply with particular requirements can be a lengthy and time consuming process as it is only at the end of the design process that it is discovered whether or not the product conforms to the particular requirements. A method will now be described that enables a design to be created such that it is ensured that the design will comply with a particular set of requirements. This method is illustrated in FIG. 3.

The method is implemented on a computer and creates a design for a piece of protective equipment that complies with the relevant regulatory requirements. However this method could also be applied to any design in which certain characteristics need to be limited for reasons other than compliance with regulatory requirements. Thus this method can be used in the design of any product limited by a design constraint.

In creating such a design a number of different characteristics of the final product are taken into account. These parameters can include material thickness, material finish, material impact resistance, material weight, material volume, material energy absorption capability, shape of protective area including height and width.

In step S10 a value for a first characteristic is input. A value may be a quantitative or qualitative value depending on the characteristic concerned.

Next, in step S11, a limited range of values for at least one of the remaining characteristics is determined. This determination is made based on the value input for the first characteristic and the particular design constraint. The determination of the limited range of values is made so that any selection of values within the limited range of values determined necessarily results in the final design complying with the design constraint.

In step S12 possible values for the at least one remaining characteristics are constrained to be within the limited ranges determined in step S11.

The method is an iterative method and is repeated a number of times depending on how many characteristics need to be constrained. As such steps S13-S16 are optional steps that may be carried out if needed.

In step S13 a value for a second characteristic is input. This value may have been constrained by step S12.

In step S14 a limited range of values for at least one of the remaining characteristics is determined. This time the range of values is determined based on the values of the first and second characteristics and the design constraint.

In step S15 possible values for at least one remaining characteristic are constrained to be within the range of values determined in step S14.

As discussed above the method is iterative and can be repeated until all of the relevant characteristics are constrained. In this way a design can be achieved that is ensured to comply with the design constraint.

In step S16 a visual representation or performance description of the design is created so that final approval of the design can be given before it is manufactured in step S17.

The method also has a direct feedback loop such that if it is decided to alter the value of a particular characteristic, the range of values for the remaining characteristic are automatically updated in view of the new value of the particular characteristic and the design constraint. This facilitates alterations to the design.

Thus a method of creating a design in which the design is guaranteed to comply with a particular design constraint has been described.

In an alternative method, instead of creating the design one step at a time to ensure the design complies with a particular constraint, a method is provided that reviews the design and provides feedback as to whether or not the design complies with the particular constraint. This method is illustrated in FIG. 4.

Figure 4:
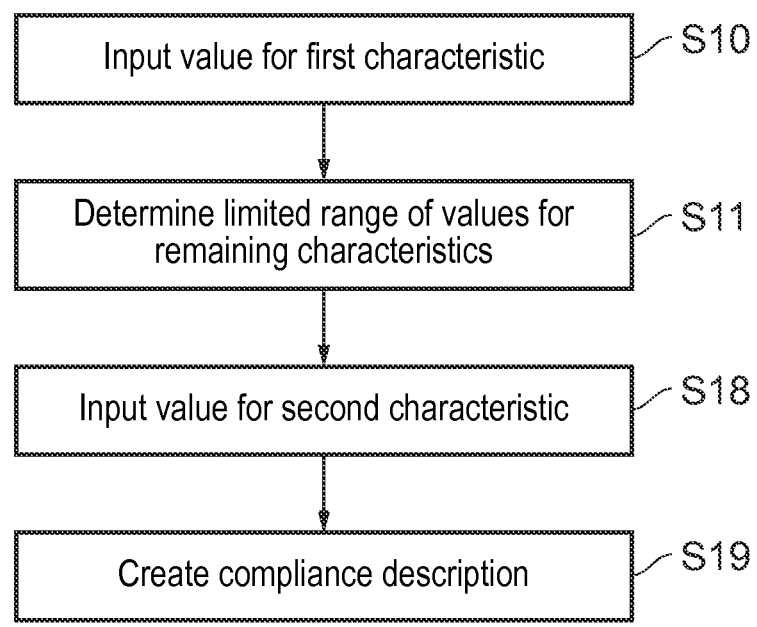
FIG. 4 is a flow chart of a method of determining the characteristics of a piece of protective equipment and providing feedback as to whether or not the equipment complies with a design constraint.

The first two steps of the method illustrated in FIG. 4 are the same as those of the method illustrated in FIG. 3. Thus in step S10 a value for a first characteristic is input. In step S11 a limited range of values for at least one of the remaining characteristics is determined using the value of the first characteristic and the design constraint.

Next in step S18 a value for a second characteristic is input. In the present example only two characteristics have values input to the method but the method is not limited to this number of inputs. Any number of inputs may be received to define a value for the corresponding number of characteristics.

Finally in step S19 a compliance description is created which describes whether or not the design complies with the particular design constraint. Thus a designer automatically knows whether his design complies with the particular design constraint.

As described above values for any number of characteristics can be input into the method. When a value for a new characteristic is input the compliance description is automatically updated. In this manner values for a plurality of characteristics may be entered and at each stage the designer receives feedback as to whether his design complies with the particular design constraint.

Any desired changes to the design are also conveniently processed according to this method. If a new value of a characteristic is input to the method then the compliance description is again automatically updated to reflect the altered value.

Thus any new input to the method results in an automatic update of the compliance description such that the design always knows whether or not their design complies with the design constraint.

Figure 5:
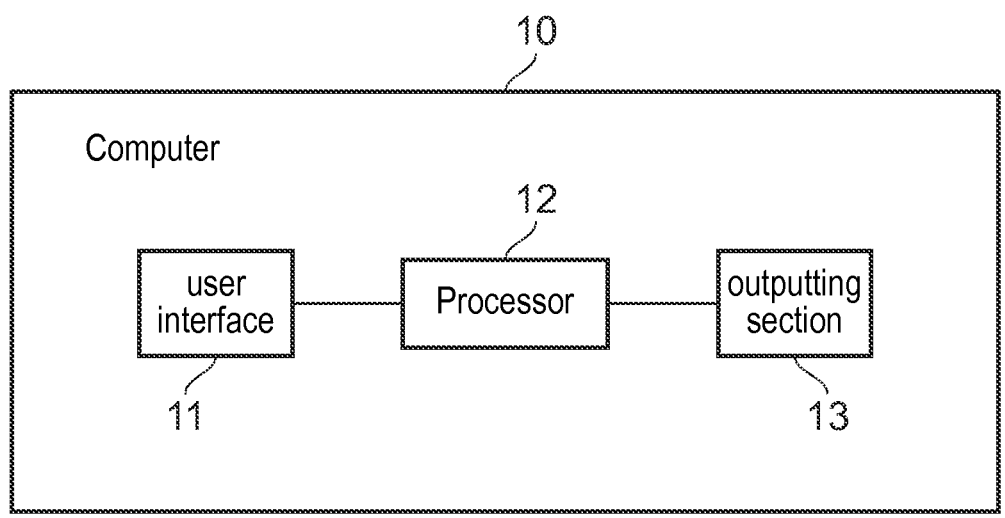
FIG. 5 illustrates an apparatus for carrying out the method of FIGS. 3 and 4.

In FIG. 5 an apparatus for creating a design for a piece of protective equipment is illustrated.

The apparatus is a computer having a user interface 11, a processor 12 and an outputting section 13. The user interface 11 is capable of receiving an input defining a value for a characteristic. The user interface 11 is further able to receive an input altering one of the characteristics.

The processor 12 uses the input received at the user interface 11 and the design constraint to determine a limited range of values for at least one remaining characteristic. The processor 12 further constrains possible values of the remaining characteristics using the user interface 11. The processor 12 is further capable of altering the range of values for the characteristics based on an updated input to the user interface 11.

The outputting section 13 is capable of displaying a visual representation of the final design. Thus the design can be reviewed before it is finalised.

A further optional feature of the apparatus is an outputting section for manufacturing the design. This may be any apparatus suitable for manufacturing the design for example a 3D printer or an injection molding machine.

Figure 6:
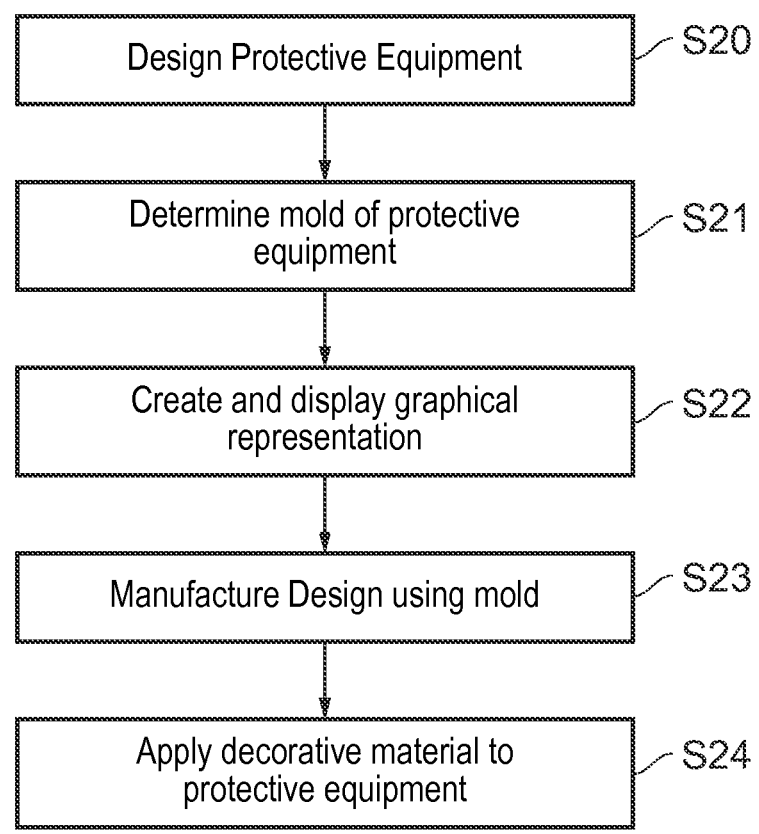
FIG. 6 is a flow chart of a method of manufacturing a piece of protective equipment from design to final details.

The two methods described above can be carried out individually or consecutively. FIG. 6 illustrates a method of manufacturing body protective equipment including the method of designing protective equipment and the method of determining a mold described above.

In step S20 the protective equipment is designed in accordance with the method described with reference to FIG. 3 or FIG. 4.

In step S21 a mold for a body part is determined according to the method described with reference to FIG. 1.

In step S22 a graphical representation of the final design on the mold can be displayed. The final design is determined based on the results of steps S20 and S21. S21 constrains the inner shape of the protective equipment whereas S20 constrains the material and outer dimensional characteristics of the protective equipment. A description of the final design including a description of its likely performance characteristics can also or alternatively be displayed. This step is an optional step that may be used in order for the final design to be approved before it is manufactured if this check is required.

In step S23 the design is manufactured with the assistance of the mold determined in step S21. The design is manufactured using any suitable device for example using a 3D printer or an injection molding machine.

Step 24 is an optional step of applying decorative material to the final product. Thus each individual can further customise the final product in terms of its appearance. For example sportsmen and women can incorporate their sponsor's logo into the product.

Although the method has been described in which the steps are carried out in the order described, it is also possible for the steps to be carried out in a different order. For example step S22 may be carried out after step S20 such that the order of the steps may be:

S20 Design protective equipment,
S22 Create and display graphical representation,
S21 Determine mold of protective equipment,
S23 Manufacture Design using mold, and then
S24 Apply decorative material to protective equipment.

Alternatively step S22 could be carried out first such that the order of the steps may be:

S21 Determine mold of protective equipment,
S20 Design protective equipment,
S22 Create and display graphical representation,
S23 Manufacture Design using mold, and then
S24 Apply decorative material to protective equipment.

Thus steps S20, S21 and S22 can be carried out in any particular order as long as step S22 is carried out after step S20.

An apparatus for manufacturing body protective equipment includes the apparatus described with reference to FIG. 5 and the apparatus described with reference to FIG. 2. The apparatus also includes a manufacturing apparatus such as a 3D printer for manufacturing the final product.

Thus a method can be provided for design and manufacture of protective equipment that allows for a degree of customization to provide enhanced performance characteristics without incurring high cost. In some examples, the method includes a method of creating a design to comply with a particular design constraint, determining a mold for a body part including the steps of inputting body part information, searching a database of existing anatomical components and selecting components that most closely match the information, searching a database of body part models and selecting at least one body part model that closely corresponds to the selected components, creating a body part model from the selected components, comparing the two models and determining which model is most appropriate and using a mold associated with that model and final manufacture of the piece of protective equipment.

Example 1

A computer program product configured to instruct a computer to perform the operations of determining a mold for a body part, the instructions causing the computer to:

obtaining information describing dimensions of a body part;

using the information, searching a database of anatomical components and selecting components that in combination conform to the dimensions;

searching a database of body part models and determining a database body part model that most closely corresponds to the selected components;

creating a new model corresponding to the selected components;

comparing the database body part model and the new model and determining a value representative of the difference between the two models; and creating a new mold based on the new model when the value is greater than a threshold and using a mold associated with the database body part model when the difference is less than the threshold.

Example 2

Apparatus for creating a design for a piece of protective equipment, the design comprising a plurality of dimensional and/or material characteristics, the design conforming to a design constraint defining a performance requirement for a piece of protective equipment manufactured according to the design, the apparatus comprising:

a user interface operable to receive an input defining a value for a first characteristic of the plurality of characteristics; and a processor operable to determine a limited range of values for at least one of the remaining characteristics based on the value of the first characteristic and the design constraint, such that subsequent selection of value within the limited range of values will result in the design conforming to the design constraint and operable to constrain using the user interface possible values for the at least one of the remaining characteristics to be within the limited range of values.

Example 2A

Apparatus according to example 2 wherein the user interface is operable to receive input defining a value for a second characteristic; and wherein the processor is operable to determine a limited range of values for at least one of the remaining characteristics based on the values of the first and second characteristics and the design constraint such that subsequent selection of values within the limited range of values will result in the design conforming to the design constraint and operable to constrain using the user interface possible values for the at least one of the remaining characteristics to be within the limited range of values.

Example 2B

Apparatus according to example 2 wherein the user interface is operable to receive input altering the value of one of the plurality of characteristics and wherein the processor is operable to automatically alter the range of values for the remaining characteristics based on the input received.

Example 2C

Apparatus according to example 2 comprising a design outputting section operable to display a visual representation of the design according to the defined values of the characteristics.

Example 2D

Apparatus according to example 2 comprising an outputter operable to output the protective equipment according to the design.

Example 2E

Apparatus according to example 2D wherein the outputter comprises a 3D printer.

Example 3

Apparatus for determining a mold for a body part, the apparatus comprising:

an interface operable to receive information describing the dimensions of a body part;

a processor operable to use the information to search a database of anatomical components and select components that in combination conform to the dimensions; and operable to search a database of body part models and determine a database body part model that most closely corresponds to the selected components;

a generator operable to create a new model corresponding to the selected components;

a comparator operable to compare the database body part model and the new model and to determine a value representative of the difference between the two models;

a generator operable to create a new mold when the value is greater than a threshold; and wherein when the difference is less than a threshold a mold associated with the database body part model is used.

Example 4

Apparatus for manufacturing body protective equipment the apparatus comprising:

an apparatus for creating a design for a piece of protective equipment, the design comprising a plurality of dimensional and/or material characteristics, the apparatus comprising:

a user interface operable to receive an input defining a value for a first characteristic of the plurality of characteristics; and a processor operable to determine a limited range of values for at least one of the remaining characteristics based on the value of the first characteristic and the design constraint, such that subsequent selection of value within the limited range of values will result in the design conforming to the design constraint and operable to constrain using the user interface possible values for the at least one of the remaining characteristics to be within the limited range of values;

an apparatus for constructing a mold for a body part comprising:

an interface operable to receive information describing the dimensions of a body part;

a processor operable to use the information to search a database of anatomical components and select components that in combination conform to the dimensions; and operable to search a database of body part models and determine a database body part model that most closely corresponds to the selected components;

a generator operable to create a new model corresponding to the selected components;

a comparator operable to compare the database body part model and the new model and to determine a value representative of the difference between the two models;

a generator operable to create a new mold when the value is greater than a threshold; and wherein when the difference is less than a threshold a mold associated with the database body part model is used; and an outputter operable to output the protective equipment according the characteristics of the design and the mold.

Example 4A

Apparatus according to example 4 wherein the outputter comprises a 3D printer.

Although the method and apparatus have been described with particular reference to protective equipment, the skilled person will appreciate that this method can be used in a variety of different applications where the shape of the user's body part is a factor in the effectiveness of the product. For example compression stockings are designed to apply compression to the user's leg and thus the particular shape of the user's leg may affect the performance of the product. Thus it has been shown that the method and apparatus described are not limited to the examples discussed in the description but include any alternatives that fall within the scope of the appended claims.

The invention claimed is:

1. A method of determining a mold for a body part, the method comprising:
   obtaining information describing dimensions of a body part;
   using the information, searching a database of anatomical components and selecting components that in combination conform to the dimensions;
   searching a database of body part models and determining a database body part model that most closely corresponds to the selected components;
   creating a new model corresponding to the selected components;
   comparing the database body part model and the new model and determining a value representative of the difference between the two models; and
   creating a new mold based on the new model when the value is greater than a threshold and using a mold associated with the database body part model when the difference is less than the threshold.

2. A method according to claim 1 wherein the step of searching the database of anatomical components and selecting components that in combination conform to the dimensions comprises scaling one or more of the anatomical components before they are combined.

3. A method according to claim 1 wherein the body part is a human leg and the selected anatomical components comprise one or more selected from the group comprising: the calf area, Achilles tendon area, shin area and shin curve.

4. A method according to claim 1 wherein the step of searching the database and determining a database body part model comprises determining a plurality of database body part models.

5. A method according to claim 1 wherein the number of database body part models determined is based upon a configuration input.

6. A method according to claim 1 wherein the body part is a human leg and the determined mold is a mold for manufacture of a sock, shin guard or ankle brace.

7. A method according to claim 1 wherein the database of anatomical components comprises the database of body part models.

8. A method according to claim 1 wherein different scaling is applied to each of the selected components based upon a configuration input.

9. A method according to claim 1 wherein a relative importance of each of the selected components is determined based upon a configuration input.

10. A method according to claim 1 wherein the information relating to the body part is obtained from measuring the body part.

11. A method according to claim 1 wherein the information relating to the body part is obtained from photographs or video of the body part.

12. A method according to claim 1 wherein the information relating to the body part is obtained from a 3D scan of the body part.

13. A method according to claim 1 further comprising inserting the new model into the database.

14. A method according to claim 1 wherein the mold determined is used for manufacturing protective equipment.

15. A method of manufacturing body protective equipment, the method comprising:
   designing the protective equipment by:
      receiving input to define a value for a first characteristic of the plurality of characteristics;
      determining a limited range of values for at least one of the remaining characteristics based on the value of the first characteristic and the design constraint, such that subsequent selection of values within the limited range of values will result in the design conforming to the design constraint; and
      constraining possible values for the at least one of the remaining characteristics to be within the limited range of values;
   generating a mold of the body part by:
      obtaining information describing dimensions of a body part;
      using the information, searching a database of anatomical components and selecting components that in combination conform to the dimensions;
      searching a database of body part models and determining a database body part model that most closely corresponds to the selected components;
      creating a new model corresponding to the selected components;
      comparing the database body part model and the new model and determining a value representative of the difference between the two models; and
      creating a new mold based on the new model when the value is greater than a threshold and using a mold associated with the database body part model when the difference is less than the threshold; and
   manufacturing the protective equipment according to the characteristics and the mold.

16. A method according to claim 15 comprising creating a graphical representation of the protective equipment or a performance description according to the characteristics and the mold before the protective equipment is manufactured.

17. A method according to claim 15 wherein the protective equipment is manufactured by 3D printing.

18. A method according to claim 15 comprising applying decorative material onto the protective equipment.

19. A method according to claim 18 wherein the decorative material comprises text, images, signatures, textures or other graphical elements.

20. A method according to claim 18 wherein the decorative material is based on a configuration input.

21. A method according to claim 15 wherein the protective equipment is one of a shin guard, a knee pad, an elbow pad or a protective vest.

* * * * *